United States Patent Office 2,945,813
Patented July 19, 1960

2,945,813
COPPER CORROSION RESISTANT GREASE COMPOSITIONS

John L. Dreher, Berkeley, and Crawford F. Carter, Concord, Calif., assignors to California Research Corporation, San Francisco, Calif., a corporation of Delaware No Drawing. Filed July 17, 1957, Ser. No. 672,340

15 Claims. (Cl. 252—33.6)

This invention is directed to high temperature grease compositions substantially noncorrosive to copper.

Numerous military and industrial grease specifications now describe grease compositions having dropping points in excess of 400° F. This desire for high temperature greases is the result, for example, of the development of smaller gears to withstand greater loads than heretofore expected of larger gears, etc. The continuing trend to manufacture automobiles with lower centers of gravity has made it necessary to use smaller gears, particularly in such gear assemblies as the differentials and transmissions. The small gears thus used have considerably greater pressures exerted upon them per unit area than the older type gear assemblies. Thus, machines having higher loads on bearings and gears, along with high speeds, require grease compositions which will function at higher temperatures than heretofore necessary.

In the lubrication of ball bearings, roller bearings, gears, and sliding and rolling surfaces of automotive equipment, diesel engines, aircraft assemblies, etc., it is of utmost importance that the grease compositions are noncorrosive to copper surfaces at high temperatures. For example, standard cylindrical roller bearings, spherical roller bearings (e.g., particularly those used in rolling mills), worm gears, helical gears, etc., have bronze retainers which are readily corrodable at high temperatures. Electronic equipment and numerous industrial instruments have copper bearings and copper sleeves. These must be lubricated by grease compositions which are noncorrosive to copper.

In accordance with this invention, it has been discovered that grease compositions having the desirable characteristics set forth hereinabove are obtained by greases thickened by metal salts of terephthalamic acids, and having incorporated therein a metal soap of a hydroxy-substituted fatty acid. Thus, the grease composition of this invention comprises an oil of lubricating viscosity (i.e., a lubricating oil), a metal salt of a terephthalamic acid, and a metal salt of a hydroxy-substituted fatty acid.

The grease compositions embodied herein are characterized as having high melting points, being highly resistant to emulsification in water, and having outstanding noncorrosivity to copper surfaces. Thus, the grease compositions herein withstand services wherein high pressures are encountered, and combine the characteristics of high melting point, resistance to oxidation, high resistance to emulsification in water, high work stability, high compatibility with other grease compositions, and extremely low corrosivity to copper.

The terephthalamic acid salts used herein to thicken lubricating oils to the consistency of a grease (which are further described in U.S. Patent No. 2,820,012, filed December 14, 1954), have the following formula:

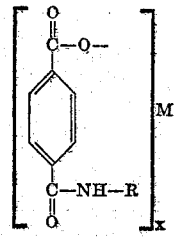

wherein R is an organic radical, such as straight-chain, branched-chain, or cyclic saturated or unsaturated hydrocarbon radicals, M is a metal, and $x$ is a number having a value equal to the valence of the metal M. When R is a straight-chain or branched-chain radical, this radical may contain from 1 to 22 carbon atoms; however, because of the greater effectiveness obtained as copper-corrosion inhibitors, it is preferred that R is an aliphatic radical containing from 4 to 22 carbon atoms. As a cyclic radical, it is preferred that R contains a total of 6 to 28 carbon atoms.

Examples of R include the following radicals: methyl, ethyl, propyl, n-butyl, tertiarybutyl, pentyl, 2-methylbutyl, n-hexyl, 2-methylpentyl, 2,3-dimethylbutyl, heptyl, isoheptyl, octyl, 2-ethylhexyl, isooctyl, nonyl, decyl, decenyl, dodecyl, tetradecyl, ethylhexyl, hexyldecyl, hexadecyl, hexadecenyl, octadecyl, octadecenyl, methylphenyl, ethylphenyl, propylphenyl, butylphenyl, octylphenyl, decylphenyl, dodecylphenyl, tetradecylphenyl, hexadecylphenyl, octadecylphenyl, octadecenylphenyl, etc.

The metals which can be used in the formation of the terephthalamic acid salts include the metals of Groups I, II, III, and IV of Mendeléeff's Periodic Table. Particular metals include aluminum, lead, lithium, sodium, potassium, silver, magnesium, calcium, zinc, strontium, cadmium, and barium. Because of the higher melting point, improved texture, and greater work stability, it is preferred that the sodium and barium metals be used.

Examples of metal salts of terephthalamic acids which are used herein to thicken lubricating oils to the consistency of grease compositions include sodium N-methyl terephthalamate, sodium N-ethyl terephthalamate, sodium N-butyl terephthalamate, sodium N-amyl terephthalamate, sodium N-hexyl terephthalamate, sodium N-octyl terephthalamate, sodium N-decyl terephthalamate, sodium N-tetradecyl terephthalamate, sodium N-hexadecyl terephthalamate, sodium N-octadecyl terephthalamate, sodium N-eicosyl terephthalamate, sodium N-docosyl terephthalamate, sodium N-phenyl terephthalamate, sodium N-methylphenyl terephthalamate, sodium N-butylphenyl terephthalamate, sodium N-hexylphenyl terephthalamate, sodium N-octaphenyl terephthalamate, sodium N-decylphenyl terephthalamate, sodium N-tetradecylphenyl terephthalamate; barium di(N-methyl terephthalamate), barium di(N-ethyl terephthalamate), barium di(N-butyl terephthalamate), barium di(N-amyl terephthalamate), barium di(N-hexyl terephthalamate), barium di(N-octyl terephthalamate), barium di(N-decyl terephthalamate), barium di(N-tetradecyl terephthalamate), barium di(N-hexadecyl terephthalamate), barium di(N-octadecyl terephthalamate), barium di(N-eicosyl terephthalamate), barium di(N-docosyl terephthalamate) barium di(N-phenyl terephthalamate), barium di(N-methylphenyl terephthalamate), barium di(N-butylphenyl terephthalamate), barium di(N-hexylphenyl terephthalamate), barium di(N-octylphenyl terephthalamate), barium di(N-decylphenyl terephthalamate), barium di(N-tetradecylphenyl terephthalamate), etc.

The hydroxy-substituted fatty acids used herein in the formation of the metal soaps include the monohydroxy- and the polyhydroxy-substituted fatty acids containing from 14 to 22 carbon atoms, particularly the 12-hydroxystearic acid and the 9,10-dihydroxy stearic acid. However, because of the effectiveness of the soaps thereof, the 12-hydroxy-stearic acid is preferred. The metals which can be used in the formation of the soaps of the hydroxy-substituted fatty acids include the alkali metals (e.g., sodium and lithium), preferably sodium, and the alkaline earth metals (e.g., calcium and barium), preferably calcium. Sodium 12-hydroxy stearate is the particularly preferred additive herein.

In the formation of the hydroxy-substituted fatty acid soaps, it is understood that the starting materials may also be esters of fatty acids, including the fatty acid glycerides.

Lubricating oils which are suitable base oils for the compositions of this invention include a wide variety of lubricating oils, such as naphthenic base, paraffin base, and mixed base mineral oils, such as petroleum oils; other hydrocarbon lubricants, e.g., lubricating oils derived from coal products; and synthetic oils, e.g., alkylene polymers (such as polymers of propylene, butylene, etc., and mixtures thereof), alkylene oxide type polymers, dicarboxylic acid esters, liquid esters of acids of phosphorus, alkylbenzene, polymers containing silicon, etc. Synthetic oils of the alkylene oxide type polymers which may be used include those exemplified by the alkylene oxide polymers (e.g., propylene oxide polymers) and derivatives, including alkylene oxide polymers prepared by polymerizing the alkylene oxides, e.g., propylene oxide, in the presence of water or alcohols, e.g., ethyl alcohol; esters of ethylene oxide type polymers, e.g., acetylated ethylene oxide polymers prepared by acetylating ethylene oxide polymers containing hydroxyl groups; polyethers prepared from ethylene glycols, e.g., ethylene glycol; etc.

Synthetic oils of the dicarboxylic acid ester type include those which are prepared by esterifying such dicarboxylic acids as adipic acid, azelaic acid, suberic acid, sebacic acid, alkenyl succinic acid, fumaric acid, maleic acid, etc., with alcohols such as butyl alcohol, hexyl alcohol, 2-ethylhexyl alcohol, dodecyl alcohol, etc. Examples of dibasic (dicarboxylic acid) acid ester synthetic oils include dibutyl adipate, dihexyl adipate, and di-2-ethylhexyl sebacate.

Synthetic oils of the alkylbenzene type include those which are prepared by alkylating benzene (e.g., dodecylbenzene, tetradecylbenzene, etc.). Synthetic oils of the types of polymers containing silicon include the liquid esters of silicon and the polysiloxanes; e.g., poly(methylphenyl) siloxane, and poly(siloxy glycols); the silicates, which include those exemplified by tetraethyl silicate, tetraisopropyl silicate, etc.

The above base oils may be used individually as such or in various combinations, wherever miscible or wherever made so by the use of mutual solvents.

The metal salts of terephthalamic acids are admixed with lubricating oils in amounts sufficient to form grease compositions, that is, sufficient to thicken the lubricating oils to the consistency of greases. Although amounts from 3% to 50%, by weight, of the terephthalamate grease-thickening agents are usually suitable, it is preferred to use amounts from 7% to 30%, by weight.

The hydroxy-substituted fatty acid soaps are used in amounts sufficient to inhibit copper corrosion, preferably from about 0.2% to 15%, by weight, of the final composition.

The metal terephthalamates and hydroxy-substituted fatty acid soaps are present in such amounts that the mol ratios of the metal salts of terephthalamic acids to the metal soaps of the hydroxy-substituted fatty acids range from about 1.5:1 to about 19:1; the mol ratios having values from about 1.5 to about 19, preferably from about 2.5 to about 7.

In all instances, the metal salts of terephthalamic acids are the grease thickening agents, not the metal soaps of hydroxy-substituted fatty acids.

The examples hereinbelow illustrate the practice of this invention in the use of hydroxy-substituted fatty acid soaps as copper corrosion inhibitors for grease compositions thickened with metal salts of terephthalamic acids. Examples 1, 2, and 3 illustrate the formation of grease compositions thickened with metal salts of terephthalamic acids.

EXAMPLE 1.—PREPARATION OF A GREASE THICKENED WITH SODIUM N-"OCTADECYL" TEREPHTHALAMATE

A mixture of 250 grams of methyl N-"octadecyl" terephthalamate, 21 grams of sodium hydroxide in 25 grams of water, and 2152.5 grams of a California solvent-refined paraffin base oil having a viscosity of 480 SSU at 100° F. was blended together by heating to a maximum temperature of 220° F. This mixture was then passed through a homogenizer at the rate of 3 pounds per minute at a pressure of 4000 p.s.i.g. The temperature of the mix as it went into the mill was 130° F., and the temperature of the grease coming out of the mill was 170° F. The resulting grease composition had a worked penetration of 335 at 77° F. after 60 strokes in the ASTM worker, and the ASTM dropping point was 478° F.

The "octadecyl" radical of the terephthalamate was obtained from amines known as "Armeen HT," sold by the Armour Company, Chicago, Illinois, and containing 70% octadecylamine, 5% octadecenylamine, and 25% hexadecylamine.

EXAMPLE 2.—PREPARATION OF A GREASE THICKENED WITH BARIUM N-"OCTADECYL" TEREPHTHALAMATE

A mixture of 250 grams of the methyl N-"octadecyl" terephthalamate, 97.5 grams of barium hydroxide octahydrate in 1500 grams of water, and 2152.5 grams of a California solvent-refined paraffin base oil having a viscosity of 480 SSU at 100° F., was slowly heated to a maximum temperature of 380° F., after which the mixture was cooled to 130° F. The cooled mixture was introduced into a homogenizer at the rate of 3 pounds per minute at a pressure of 4000 p.s.i.g. The resulting grease composition had a worked penetration of 321 at 77° F. after 60 strokes in the ASTM worker, and the ASTM dropping point was 500+° F.

EXAMPLE 3. — PREPARATION OF A GREASE THICKENED WITH LITHIUM N-"OCTADECYL" TEREPHTHALAMATE

A mixture of 250 grams of methyl N-"octadecyl" terephthalamate, 25.9 grams of lithium hydroxide monohydrate in 30 grams of water, and 2224 grams of a California solvent-refined paraffin base oil having a viscosity of 480 SSU at 100° F., was slowly heated to a temperature of 220° F., with rapid stirring, then heated to 300° F. The mixture was cooled to 130° F., and passed through a homogenizer at the rate of 3 pounds per minute at a pressure of 4000 p.s.i.g. The resulting grease composition had a worked penetration at a value of 264 at 77° F. after 60 strokes in the ASTM worker, and the ASTM dropping point was 430° F.

EXAMPLE 4.—PREPARATION OF SODIUM N-"OCTADECYL" TEREPHTHALAMATE - THICKENED GREASE CONTAINING SODIUM 12-HYDROXYSTEARATE

A mixture of 41.6 pounds of methyl N-"octadecyl" terephthalamate, 10.4 pounds of 12-hydroxystearic acid, and 84 pounds of a California solvent-refined paraffin base white oil having a viscosity of 100 SSU at 100° F. was heated to 300° F. until a uniform solution was obtained. The mixture was cooled to 140° F., and 5.8 pounds of sodium hydroxide (in 50% aqueous solution) was added. The mixture was then heated to 250° F., to which was then added 6 pounds of oxidation inhibitor containing two-thirds trimethyl dihydroquinoline polymer and one-third phenyl, alpha-naphthylamine, after which the solution was heated to 310° F., and 252.2 pounds of di-isooctyl azelate was added. The heating was continued to a maximum temperature of 380° F. The whole mixture was then milled through a homogenizer at 4000 p.s.i. with subsequent cooling.

The test data of Tables I and II hereinbelow illustrate the effectiveness of metal salts of hydroxy-substituted fatty acids as copper corrosion inhibitors for metal terephthalamate-thickened greases. The greases were prepared as described in Example 4, hereinabove.

The base oils used are described as follows:

The "Ucon Fluids" are manufactured by the Carbide and Carbon Chemical Division of the Union Carbide and Carbon Corporation.

Base oil (a).—55% by weight "Ucon Fluid DLB-62E" (i.e., propylene oxide polymers capped at one end with an n-butyl group and at the other end with an ethyl alcohol group, and having a molecular weight of 350), and 45% by weight "Ucon Fluid LB-135" (i.e., a propylene oxide polymer capped with an n-butyl group at one end and a hydroxyl group at the other end, and having a molecular weight of 500).

Base oil (b).—7% by weight "Ucon Fluid LB-65" (i.e., a propylene polymer capped at one end with an n-butyl group and a hydroxyl group at the other end, and having a molecular weight of 350), 40% "Ucon Fluid LB-135," and 53% diisooctyl azelate.

Base oil (c).—75% diisooctyl azelate and 25% by weight of a California solvent-refined paraffin base white oil having a viscosity of 100 SSU at 100° F.

Base oil (d).—71% by weight diisooctyl azelate and 29% by weight of a California solvent-refined paraffin base white oil having a viscosity of 100 SSU at 100° F.

Base oil (e).—9.7% by weight "Ucon Fluid DLB-62E," 51.5% by weight "Ucon Fluid LB-135," and 38.8% by weight diisooctyl azelate.

Base oil (f).—18% by weight of "Ucon Fluid LB-165," 58% by weight diisooctyl azelate, and 24% California solvent-refined paraffin base white oil having a viscosity of 100 SSU at 100° F.

Base oil (g).—39.4% by weight hexa(2-ethylbutoxy) disiloxane, and 60.6% by weight "Ucon Fluid LB-135."

Base oil (h).—50% by weight of a California paraffin base oil having a viscosity of 600 SSU at 100° F., 25.3% by weight diisooctyl azelate, 19.5% by weight "Ucon Fluid LB-135," and 5.2% by weight "Ucon Fluid LB-65."

The oxidation inhibitor in all instances consisted of two-thirds trimethyldihydroquinoline polymer, and one-third phenyl, alpha-naphthylamine.

The worked penetration of the grease is the penetration at 77° F. after 60 strokes in the ASTM worker.

*Table I*

| | 1 | 2 | 3 | 4 | 5 | 6 | 7 | 8 | 9 | 10 | 11 |
|---|---|---|---|---|---|---|---|---|---|---|---|
| Grease Composition (percent by weight): | | | | | | | | | | | |
| Base Oil | 87.3 (d) | 84.2 (e) | 84.2 (f) | 85.1 (a) | 85.1 (b) | 85.1 (c) | 85.1 (c) | 85.1 (b) | 85.1 (c) | 85.2 (g) | 89.3 (h) |
| Sodium N-"Octadecyl" Terephthalamate | 11.2 | 12.2 | 12.2 | 10.6 | 10.6 | 10.6 | 9.9 | 11.0 | 11.0 | 10.1 | 8.1 |
| Sodium Stearate | | 2.1 | | | | | | | | | |
| Sodium 12-hydroxy Stearate | | | 2.1 | 2.8 | 2.8 | 2.8 | 3.5 | 2.4 | 2.4 | 2.1 | 1.2 |
| Oxidation Inhibitor | 1.5 | 1.5 | 1.5 | 1.5 | 1.5 | 1.5 | 1.5 | 1.5 | 1.5 | 2.6 | 1.4 |
| | 100.0 | 100.0 | 100.0 | 100.0 | 100.0 | 100.0 | 100.0 | 100.0 | 100.0 | 100.0 | 100.0 |
| Weight Ratio, Terephthalamate to Stearate | | 5.8 | 5.8 | 3.8 | 3.8 | 3.8 | 2.8 | 4.6 | 4.6 | 4.8 | 6.8 |
| Worked Penetration ($P_{60}$) | 260 | 260 | 271 | 273 | 284 | 267 | 267 | 269 | 273 | 259 | 305 |
| Copper Corrosion Test | Fail | Fail | Pass | Pass | Pass | Pass | Pass | Pass | Pass | Pass | Pass |
| Oil Separation, grams | 10 | | 10 | 3.3 | 2.7 | 3.0 | 1.3 | 5.5 | | 0.7 | 3.3 |

*Table II*

| | 1 | 2 | 3 | 4 | 5 | 6 | 7 |
|---|---|---|---|---|---|---|---|
| Grease Composition (percent by weight): | | | | | | | |
| Base Oil | 87.3 (d) | 84.2 (e) | 84.2 (f) | 85.1 (a) | 85.1 (b) | 85.1 (c) | 85.1 (c) |
| Sodium N-"Octadecyl" Terephthalamate | 11.2 | 12.2 | 12.2 | 10.6 | 10.6 | 10.6 | 9.9 |
| Sodium Sterate | | 2.1 | | | | | |
| Sodium 9,10-dihydroxy Stearate | | | | | | | |
| Sodium 12-hydroxy Stearate | | | 2.1 | 2.8 | 2.8 | 2.1 | 3.5 |
| Calcium 12-hydroxy Stearate | | | | | | | |
| Oxidation Inhibitor | 1.5 | 1.5 | 1.5 | 1.5 | 1.5 | 1.5 | 1.5 |
| | 100.0 | 100.0 | 100.0 | 100.0 | 100.0 | 100.0 | 100.0 |
| Weight Ratio, Terephthalamate to Stearate | | 5.8 | 5.8 | 3.8 | 3.8 | 3.8 | 2.8 |
| Worked Penetration ($P_{60}$) | 260 | 260 | 271 | 273 | 284 | 267 | 267 |
| Copper Corrosion Test | Fail | Fail | Pass | Pass | Pass | Pass | Pass |
| Oil Separation, grams | 10 | | 10 | 3.3 | 2.7 | 3.0 | 1.3 |

| | 8 | 9 | 10 | 11 | 12 | 13 | 14 |
|---|---|---|---|---|---|---|---|
| Grease Composition (percent by weight): | | | | | | | |
| Base Oil | 85.1 (b) | 85.1 (c) | 85.2 (g) | 89.3 (h) | 85.1 (b) | 84.5 (c) | 85.1 (b) |
| Sodium N-"Octadecyl" Terephthalamate | 11.0 | 11.0 | 10.1 | 8.1 | 10.6 | 10.4 | 10.6 |
| Sodium Stearate | | | | | | | |
| Sodium 9,10-dihydroxy Stearate | | | | | 2.8 | | 1 2.8 |
| Sodium 12-hydroxy Stearate | 2.4 | 2.4 | 2.1 | 1.2 | | | |
| Calcium 12-hydroxy Stearate | | | | | | 3.2 | |
| Oxidation Inhibitor | 1.5 | 1.5 | 2.6 | 1.4 | 1.5 | 1.9 | 1.5 |
| | 100.0 | 100.0 | 100.0 | 100.0 | 100.0 | 100.0 | 100.0 |
| Weight Ratio, Terephthalamate to Stearate | 4.6 | 4.6 | 4.8 | 6.8 | 3.8 | 3.2 | |
| Worked Penetration ($P_{60}$) | 269 | 273 | 259 | 305 | 335 | | 305 |
| Copper Corrosion Test | Pass | Pass | Pass | Pass | Pass | Pass | Pass |
| Oil Separation, grams | 5.5 | | 0.7 | 3.3 | 2.9 | | 3.3 |

[1] Mixture of sodium 9,10-dihydroxy stearate and 9,10,12,13-polyhydroxystearate.

The tests used in evaluating the effectiveness of hydroxy-substituted fatty acid soaps as copper corrosion inhibitors herein are described as follows:

A copper strip having the dimensions 1¾ inch by ¼ inch by 0.20 inch was bent midway between the ends to form an angle of approximately 45°. Eight grams of grease were evenly distributed between two grease dishes, and the bent copper strip was placed on the edge in each dish, so that the bottom edge of the copper strip was in contact with the dish and the top of the copper strip was exposed to the atmosphere over the grease. The dishes were placed in an oxygen bomb under the conditions of temperature and pressure of Method 5314 of Federal Test Method Standard No. 791, for a period of 20 hours. The copper strips were examined, and those that were markedly corroded were marked as "fail" and those that were clean were marked as "pass."

The oil separation test was run as follows, under Method 321.1 of Federal Test Method Standard No. 791 (formerly Federal Spectification VV-L-79e). According to this method, a 10-gram sample of grease was weighed into the copper screen of the apparatus specified for the test, with the exposed surface of the grease being smooth and convex. The cone was then suspended in a cleaned tared beaker by means of a wire hook and handle. The cone and beaker were placed in an oven and maintained at 100° C. for 30 hours, after which the assembly was removed from the oven and cooled to room temperature. The cone was lifted from the beaker and gently tapped against the inside edge of the beaker. The beaker was weighed to determine the amount of oil which had separated from the grease.

For the purpose of showing that fatty acid soaps in general would not inhibit copper corrosion, the fatty acid soap of grease No. 2 in Table I was a sodium soap of a hydrogenated tallow consisting of about 65.5% stearic acid, 32.5% palmitic acid, and 2% myristic acid.

In addition to the agents noted herein, the grease compositions of the present invention may contain rust inhibitors (e.g., metal petroleum sulfonates), lubricating agents (e.g., aromatic phosphates), color correctors, stringiness agents, extreme pressure agents, etc.

We claim:

1. A grease composition comprising a major proportion of a lubricating oil, a minor proportion, sufficient to thicken said oil to the consistency of a grease, of a metal salt of a terephthalamic acid and, in an amount sufficient to inhibit copper corrosion, a metal soap of a hydroxy-substituted fatty acid, wherein said metal, in each instance, is a metal selected from the group consisting of alkali metals and alkaline earth metals.

2. A grease composition comprising a major proportion of a lubricating oil, a minor proportion, sufficient to thicken said oil to the consistency of a grease, of a metal salt of a terephthalamic acid from 0.2% to 15%, by weight, of a metal soap of a hydroxy-substituted fatty acid, wherein said metal, in each instance, is a metal selected from the group consisting of alkali metals and alkaline earth metals.

3. A grease composition comprising a major proportion of a lubricating oil, a minor proportion, sufficient to thicken said oil to the consistency of a grease, a metal salt of a terephthalamic acid and, in an amount sufficient to inhibit copper corrosion, a metal soap of a hydroxy-substituted fatty acid selected from the group consisting of 12-hydroxystearic acid and 9,10-dihydroxystearic acid, wherein said metal, in each instance, is a metal selected from the group consisting of alkali metals and alkaline earth metals.

4. A copper corrosion inhibited lubricating composition comprising a major proportion of an oil of lubricating viscosity, from 3% to 50%, by weight, of a metal salt of a terephthalamic acid of the formula

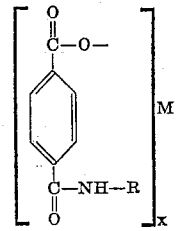

wherein R is an organic radical containing from 1 to 22 carbon atoms, M is a metal selected from the group consisting of alkali metals and alkaline earth metals, x is a number having a value equal to the valence of the metal M, and from 0.2% to 15%, by weight, of a metal soap of a hydroxy-substituted fatty acid, wherein the metal of said metal soap is a metal selected from the group consisting of alkali metals and alkaline earth metals.

5. A copper corrosion inhibited lubricating composition comprising a major proportion of an oil of lubricating viscosity, from 3% to 50%, by weight, of a metal salt of a terephthalamic acid of the formula

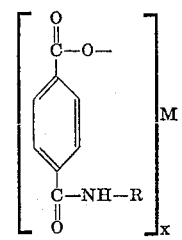

wherein R is an organic radical containing from 1 to 22 carbon atoms, M is a metal selected from the group consisting of alkali metals and alkaline earth metals, x is a number having a value equal to the valence of the metal M, and from 0.2% to 15%, by weight, of a metal soap of a hydroxy-substituted fatty acid selected from the group consisting of 12-hydroxystearic acid and 9,10-dihydroxystearic acid, wherein the metal of said metal soap is selected from the group consisting of alkali metals and alkaline earth metals.

6. A copper corrosion inhibited lubricant composition comprising a major proportion of an oil of lubricating viscosity, from 3% to 50%, by weight, of a metal salt of a terephthalamic acid of the formula

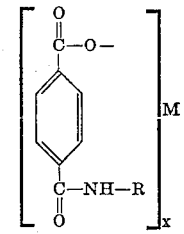

wherein R is an organic radical containing from 1 to 22 carbon atoms, M is a metal selected from the group consisting of alkali metals and alkaline earth metals, x is a number having a value equal to the valence of the metal M, and from 0.2% to 15%, by weight, of a metal soap of a hydroxy-substituted fatty acid, wherein the mol ratio of said metal salt of terephthalamic acid to said metal soap of hydroxy-substituted fatty acids has a value ranging from 1.5 to 19 and wherein the metal of said metal soap is selected from the group consisting of alkali metals and alkaline earth metals 7. A grease composition comprising a major proportion of an oil of lubricating viscosity, from 7% to 30%, by weight, of an alkali metal salt of a terephthalamic acid, and from 0.2% to 15%, by weight, of a metal soap of a hydroxy-substituted fatty acid selected from the group consisting of 12-hydroxystearic acid and 9,10-dihydroxystearic acid, wherein said metal of said soap is selected from the group consisting of alkali metals and alkaline earth metals.

8. The grease composition of claim 7, wherein the mol ratio of said metal salt of terephthalamic acid to said metal soap of hydroxy-substituted fatty acid has a value from 1.5 to about 19.

9. The grease composition of claim 7, wherein the mol ratio of said metal salt of terephthalamic acid to said metal soap of hydroxy-substituted fatty acid has a value from 2.5 to 7.

10. The grease composition of claim 7, wherein said metal soap is an alkali metal soap.

11. The grease composition of claim 7, wherein said metal soap is an alkaline earth metal soap.

12. The grease composition of claim 10, wherein said alkali metal soap is a sodium soap.

13. The grease composition of claim 11, wherein said alkaline earth metal soap is calcium.

14. A high temperature grease composition comprising an oil of lubricating viscosity and about 7% to 30%, by weight, of sodium N-aliphatic terephthalamate, wherein said aliphatic radical contains from 4 to 22 carbon atoms, and from 0.2% to 15%, by weight, of sodium 12-hydroxystearate in an amount such that the mol ratio of said sodium terephthalamate to said sodium 12-hydroxystearate has a value from 2.5 to 7.

15. A high temperature grease composition comprising an oil of lubricating viscosity and about 7% to 30%, by weight, of sodium N-octadecyl terephthalamate and from 0.2% to 15%, by weight, of sodium 12-hydroxystearate, the mol ratio of said sodium terephthalamate to said sodium 12-hydroxystearate being from 2.5 to 7, and wherein the amount of said sodium 12-hydroxystearate is insufficient to thicken said oil to the consistency of a grease.

References Cited in the file of this patent

UNITED STATES PATENTS 2,820,012    Hotten _____ Jan. 14, 1958